United States Patent [19]

Nishihara

[11] Patent Number: 5,233,591
[45] Date of Patent: Aug. 3, 1993

[54] AUTO CHANGER APPARATUS WITH A DEFECT CONTROL MEMORY

[75] Inventor: Eitaro Nishihara, Ootawara, Japan

[73] Assignee: Kabushiki Kaisha Toshiba, Kawasaki, Japan

[21] Appl. No.: 511,318

[22] Filed: Apr. 19, 1990

[30] Foreign Application Priority Data

Apr. 21, 1989 [JP] Japan ................. 1-101909

[51] Int. Cl.⁵ ................. G11B 7/00; G11B 15/18
[52] U.S. Cl. ................. 369/54; 369/48; 369/32; 360/69
[58] Field of Search ........... 369/32, 48, 49, 54, 369/59, 47, 58, 34; 360/31, 69, 48, 49, 53, 27; 364/247.3, 247.5, 186, 187, 246.11, 271.07

[56] References Cited

U.S. PATENT DOCUMENTS

| | | | |
|---|---|---|---|
| 4,827,462 | 5/1989 | Flannagan et al. | 369/32 |
| 4,835,757 | 5/1989 | Abiko | 369/32 |
| 4,924,331 | 5/1990 | Robinson et al. | 360/49 |
| 4,953,122 | 8/1990 | Williams | 369/59 |
| 4,984,230 | 1/1991 | Satoh et al. | 369/54 |
| 5,025,432 | 6/1991 | Naito | 369/34 |
| 5,068,842 | 11/1991 | Naito | 369/32 |

Primary Examiner—Aristotelis Psitos
Assistant Examiner—Nabil Hindi
Attorney, Agent, or Firm—Oblon, Spivak, McClelland, Maier & Neustadt

[57] ABSTRACT

An auto changer apparatus for an optical disk, having a large number of optical disks which are contained in a shelf, and one of which is selected and picked up by an arm mounted at a disk installment unit, and is installed in a disk drive unit, includes a defect control memory and a directory memory. The defect control memory stores defect control data of each optical disk as a table. Upon an initial operation, initial defect control data is transferred from a control block of the optical disk to the defect control memory, and an initial defect control table is made. If a defective block is found in a write mode or a read-after-write mode, data associated with the defective block is stored in the defect control memory, and the defect control table is updated. The directory memory stores a correspondence table of a logical address of the auto changer apparatus and a physical address of each disk. The auto changer apparatus performs a pre-process such a substitute processing for a defective block and making of a directory in accordance with the data in the defect control table and the data in the directory memory upon access to the disk.

6 Claims, 5 Drawing Sheets

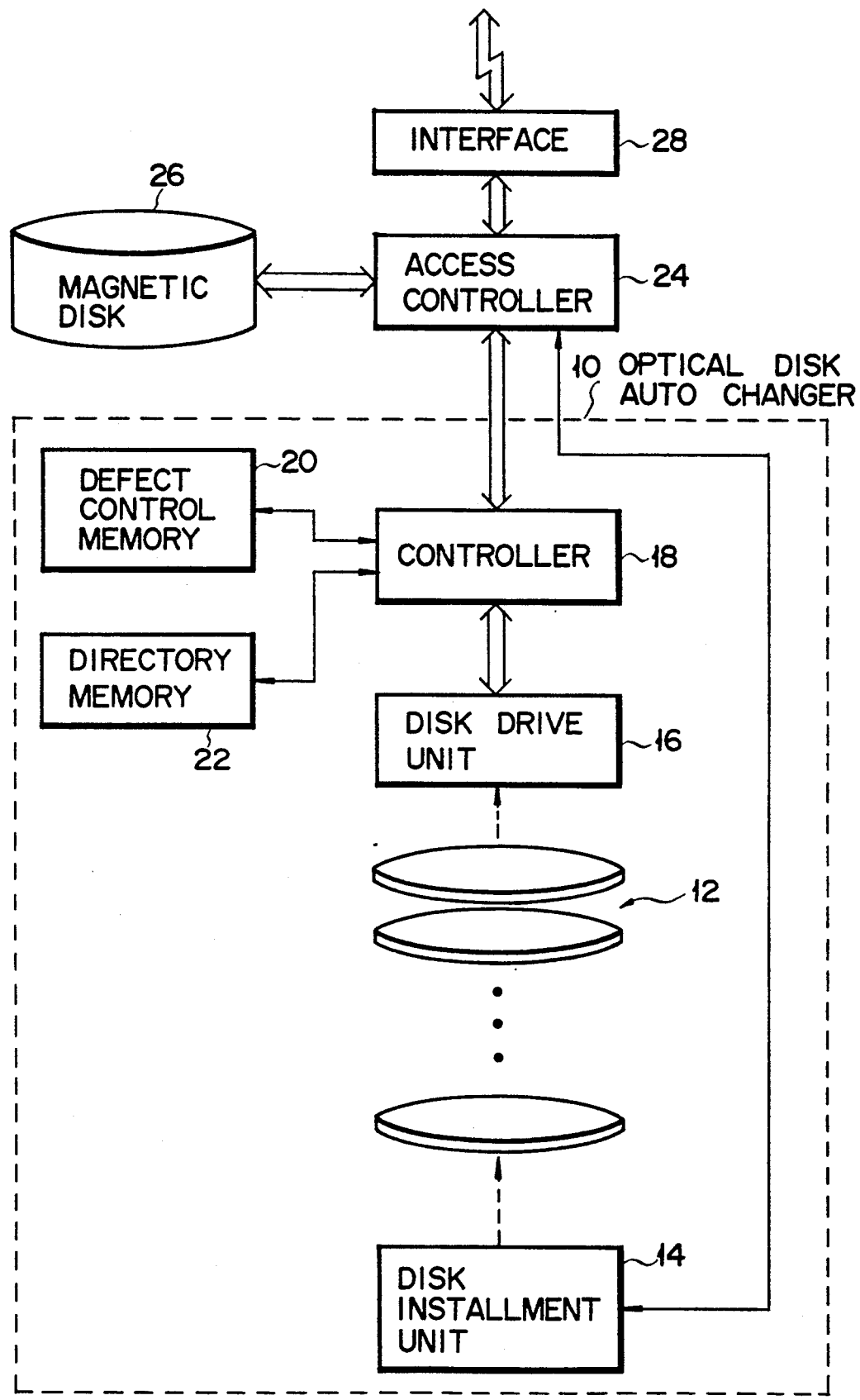
F I G. 1

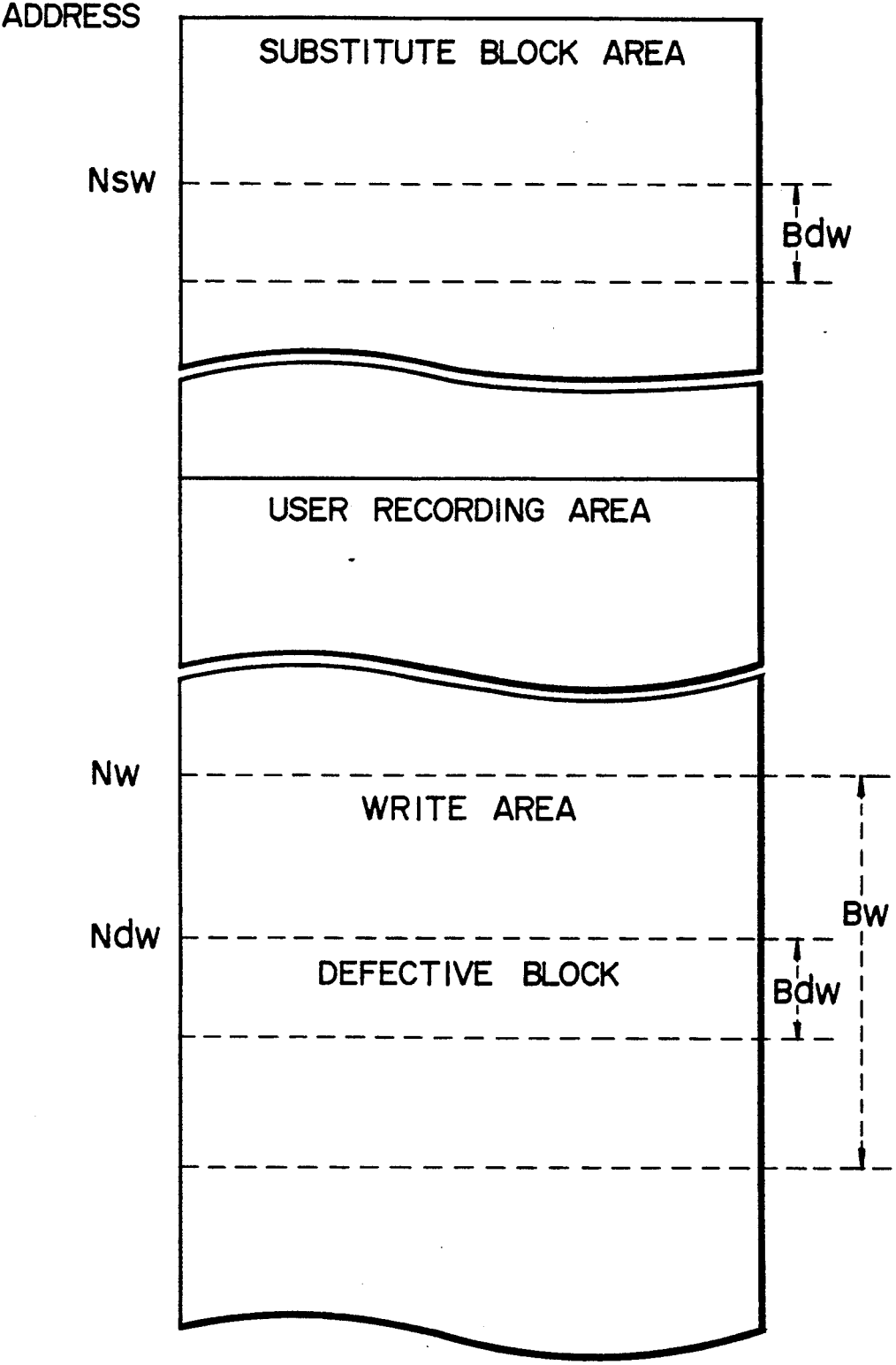
F I G. 5

AUTO CHANGER APPARATUS WITH A DEFECT CONTROL MEMORY

BACKGROUND OF THE INVENTION

1. Field of the Invention

The present invention relates to an auto changer apparatus for a recording medium, which has a number of recording media and sequentially installs a selected one of the media in an archiving/retrieving unit and, more particularly, to a control system for the archiving/ retrieving data.

2. Description of the Related Art

In such an auto changer apparatus, a recording medium is replaceable with respect to the archiving/ retrieving unit, and which medium is installed and when it is installed are unknown. Therefore, upon installment of each medium in the archiving/retrieving unit, defect control data of the installed medium is read out from the medium, and a pre-process such as substitute processing of a defective track for a normal track is performed. The pre-process includes making of a directory in addition to the above processing. Thus, in a conventional auto changer apparatus, access must be started in practice after the defect control data is read out from a medium upon installment of the medium in the archiving/retrieving unit and a pre-process is performed. Therefore, when replacement of the recording medium is frequently performed, and a large number of recording media are accessed, a ratio of a time period required for performing the pre-process with respect to the total access time is increased, and hence an access time is undesirably prolonged.

SUMMARY OF THE INVENTION

It is an object of the present invention to provide an auto changer apparatus, having a number of recording media, for installing a selected one of the media in an archiving/retrieving unit to be replaceable, in which a time period required for a Pre-process can be reduced, thus shortening an access time to a medium.

According to the present invention, there is provided an auto changer apparatus comprising memory means for recording defect control data associated with substitute processing and directory data, first controller means for reading out the defect control data from all the recording media prior to access to the recording medium, and for writing the defect control data in the memory means, and second controller means for determining whether o not a defective block is present in an access area in the recording medium selected in accordance with the directory data in the memory means on the basis of the defect control data in the memory means upon an access to the recording medium, performing substitute processing of the defective block for a normal block when it is detected that the defective block is present, and updating the defect control data in the memory means when a new defective block is detected.

According to the present invention, defect control data in all the recording media in the auto changer apparatus are read out upon an initial operation to make a defect control table in the memory means. In an access mode, a directory is formed in the memory means, and one of the recording media is selectively accessed in accordance with the directory data. Substitute processing is performed on the basis of the defect control table, if necessary. If a new defective block is detected on the recording medium during access, the defect control table in the memory means is updated. Therefore, the defect control data and the directory data need not be read out from the medium upon each access of the medium, and the defect control data and the directory data need only be read out from the memory means. Therefore, a time period required to perform a pre-process such as substitute processing of a defective track for a normal track and making of a directory can be shortened. As a result, an access time to the recording medium can also be shortened.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiments given below, serve to explain the principles of the invention.

FIG. 1 is a block diagram of an entire optical disk filing system including an embodiment of an auto changer apparatus according to the present invention;

FIG. 5 is a memory map for explaining substitute processing in the write mode.

DETAILED DESCRIPTION OF THE PREFERRED EMBODIMENTS

Figure 2:
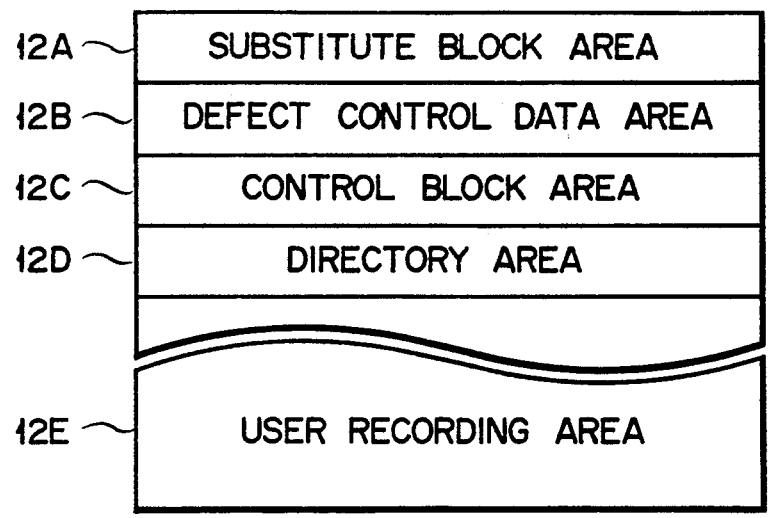
FIG. 2 is a view showing a data format of one optical disk.

An auto changer apparatus according to an embodiment of the present invention will be described hereinafter with reference to the accompanying drawings. FIG. 1 is a block diagram of an entire optical disk filing system including the auto changer apparatus according to the embodiment of the present invention. In FIG. 1, a section surrounded by a broken line is an optical disk auto changer 10. The auto changer 10 incorporates a large number of optical disks 12. In this embodiment, each optical disk is of a write-once type. The optical disks 12 are contained in, e.g., a shelf (not shown). A selected one of the disks 12 is picked up by, e.g., an arm (not shown) mounted at a disk installment unit 14, and is installed in a disk drive unit 16 for performing an archiving/retrieving operation. The disk installment unit 14 is controlled by an external access controller 24 arranged outside the auto changer 10.

A data format of one optical disk 12 is shown in FIG. 2. The entire data recording area in the optical disk 12 is divided into a substitute block area 12A, a defect control data area 12B, a control block area 12C, a directory area 12D, and a user recording area 12E. A block is a recording area having a predetermined number of bytes. In general, since the optical disk 12 may often include a defective block incapable of performing an archiving/retrieving operation, the presence/absence of a defective block in the access area is determined prior to access. If a defective block is present, substitute processing must be performed to automatically substitute the defective block by a normal block. A substitute block used in this substitute processing is included in the substitute block area 12A, and control data for this substitution is recorded in the defect control data area 12B. The control block area 12C stores data associated with types of optical disks and defect control data associated with an initial defective block which is found when the optical disk is shipped, i.e., the position of the initial defective block, and the position of a substitute block for the initial defective block.

Returning to FIG. 1, the disk drive unit 16 is controlled by a controller 18. The controller 18 is connected to a defect control memory 20 and a directory memory 22 (each memory formed of a nonvolatile semiconductor memory such as an EPROM, an EEPROM, or a battery back-up RAM, in which data is not erased even if a power supply is turned off). The defect control memory 20 stores defect control data for each optical disk 12 as a table. Upon an initial operation, initial defect control data is transferred from the control block area 12C in the optical disk 12 to the defect control memory 20, and an initial defect control table is made. If a defective block is found in a write mode or a read-after-write mode, data associated with the defective block is additionally stored in the defect control data area 12B in this optical disk, and is also stored in the defect control memory 20 to update the defect control table. It is noted that in an auto changer apparatus in which the optical disk 12 cannot be replaced after shipped, data associated with a defective block need not be stored in the defect control data area 12B of the disk 12, but need only be stored in the defect control memory 20. Upon another initial operation, directory data in directory area 12D of each disk 12 are transferred to the directory memory 22. The directory data are representative of the physical address of the disk. The memory 22 generates a logical address table from the directory data to convert the physical address into logical address which is a unique address of the auto changer 10. For this reason, a user of the optical auto changer 10 can regard all the optical disks 12 in the auto changer 10 as one optical disk with a large capacity which is controlled by one logical address system.

Access to the auto changer 10 is controlled by the access controller 24. The access controller 24 includes a magnetic disk 26 which stores various control programs, and is connected to, e.g., a communication line or a host controller (neither are shown) through a communication interface 28. More specifically, the data in each optical disk 12 is transferred to the host controller through the controller 18 and the interface 28.

An operation of this embodiment will be described hereinafter. A defective block in the optical disk 12 includes the following blocks in addition to the above-mentioned initial defective blocks. That is, a block detected to be incapable of access due to a tracking error or a synchronous error during a write operation of data, and a block detected to be a defective block upon execution of a read-after-write operation after the writing operation of data. In a read-after-write mode, data is reproduced with a correction capability which is smaller than that in normal error correction. Therefore, the reliability of recorded data can be more strictly checked. Any defective blocks are written in the defect control data area 12B in the optical disk 12 at a timing of detection, and are also stored in the defect control memory 20 to update the defect control table, as needed.

Figure 3:
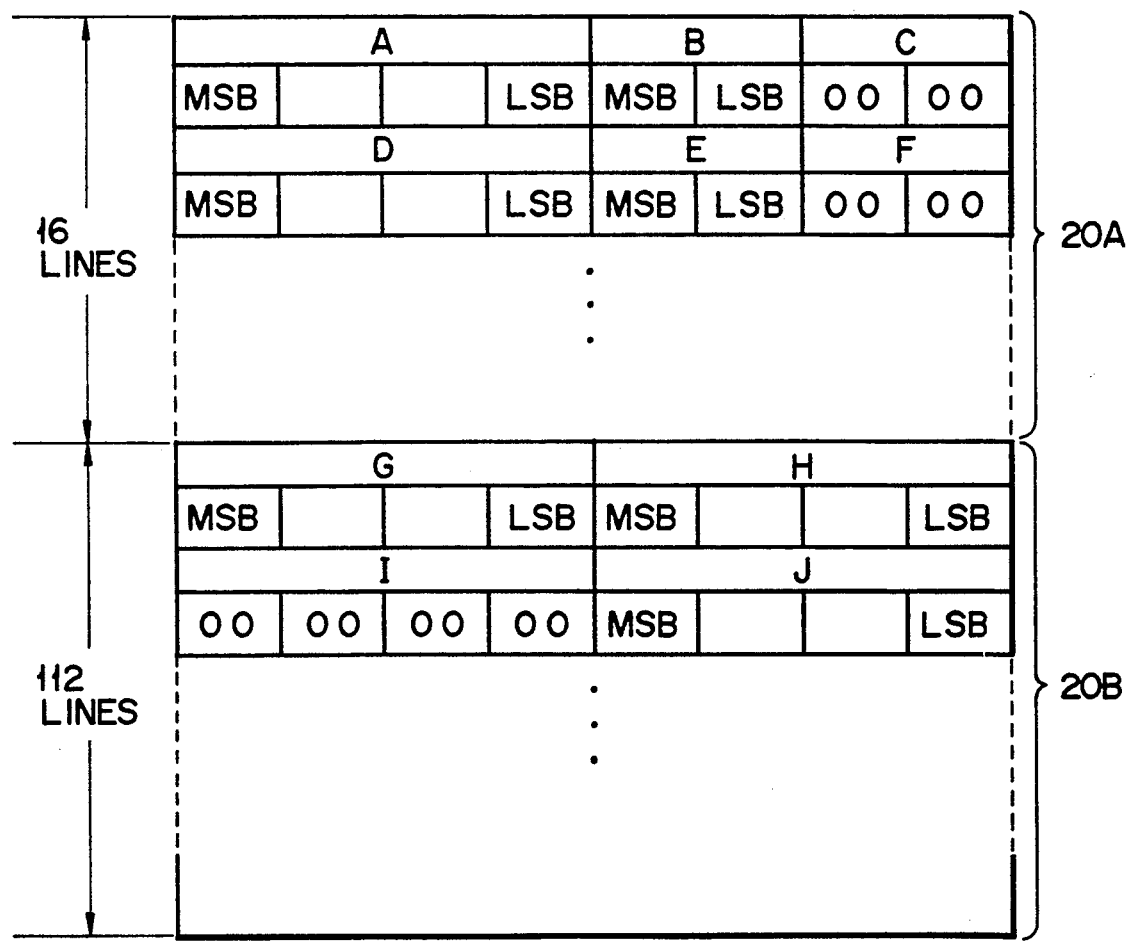
FIG. 3 is a view showing a data format of a defect control table in the auto changer apparatus.

FIG. 3 shows data format of the defect control table in the defect control memory 20. The defect control data has 1 Kbyte (128 lines: 1 line consists of 8 bytes) capacity for each disk. FIG. 3 shows a table for one disk. The defect control table can be roughly classified into a data area (16 lines) 20A for substitute processing of an initial defective block, and a data area (112 lines) 20B for substitute processing for a defective block found in an access mode. In this embodiment, data is represented by the hexadecimal notation.

The data area for substitute processing for one initial defective block area consists of two lines. This data area includes a head physical block address A (4 bytes) of the initial defective block area, the size (the number of blocks) B (2 bytes) of the defective block area, C(=0000) (2 bytes), a head physical block address D (4 bytes) of a substitute block area, the size E (2 bytes) of the substitute block area, and F(=0000) (2 bytes). In the initial defective block area, a maximum of 8 areas can be recorded in a table, and can be substituted. If the number of initial defective block areas is smaller than 8, 00 is set in each byte of the remaining lines. Upon initialization performed prior to an actual access to the optical disk, e.g., when the auto changer 10 is shipped from a factory, all the optical disks 12 in the auto changer 10 are sequentially installed in the disk drive unit 16. The initial defect control data is read out from the control block area 12C in each disk 12, and the readout data are used as data for substitute processing for the initial defect block area.

In the data area 20B for substitute processing for a defective block area found in the access mode, a substitute block is assigned to each of blocks which cannot be accessed during a data write operation, and a block determined to be a defective block in a read-after-write mode after the data write operation. The data area 20B for each defective block is constituted by a physical block address G (4 bytes) of the defective block, a physical block address H (4 bytes) of a substitute block, I(=00000000) (4 bytes), and a final physical block address J (4 bytes) of the substitute block which has been already used at a timing when an instruction is output to read out the defect control table. The substitute blocks are sequentially used from the blocks having smaller physical block addresses. A maximum of 64 defective blocks can be substituted. If the number of defective blocks is smaller than 64, 00 is set in each byte of the remaining lines.

Thus, according to this embodiment, the defective area data used for substitute processing is read out from the optical disk 12 in the auto changer 10 in advance, and is stored in the external memory 20 of the disk as a defect control table. Since when a defective block is detected during actual access the defect control table in the memory 20 is updated, the defective area data need not be read out from the disk during access to each disk to make a defect control table. Therefore, substitute processing can be performed within a short period of time, and an access time of the auto changer apparatus can be shortened.

Figure 4:
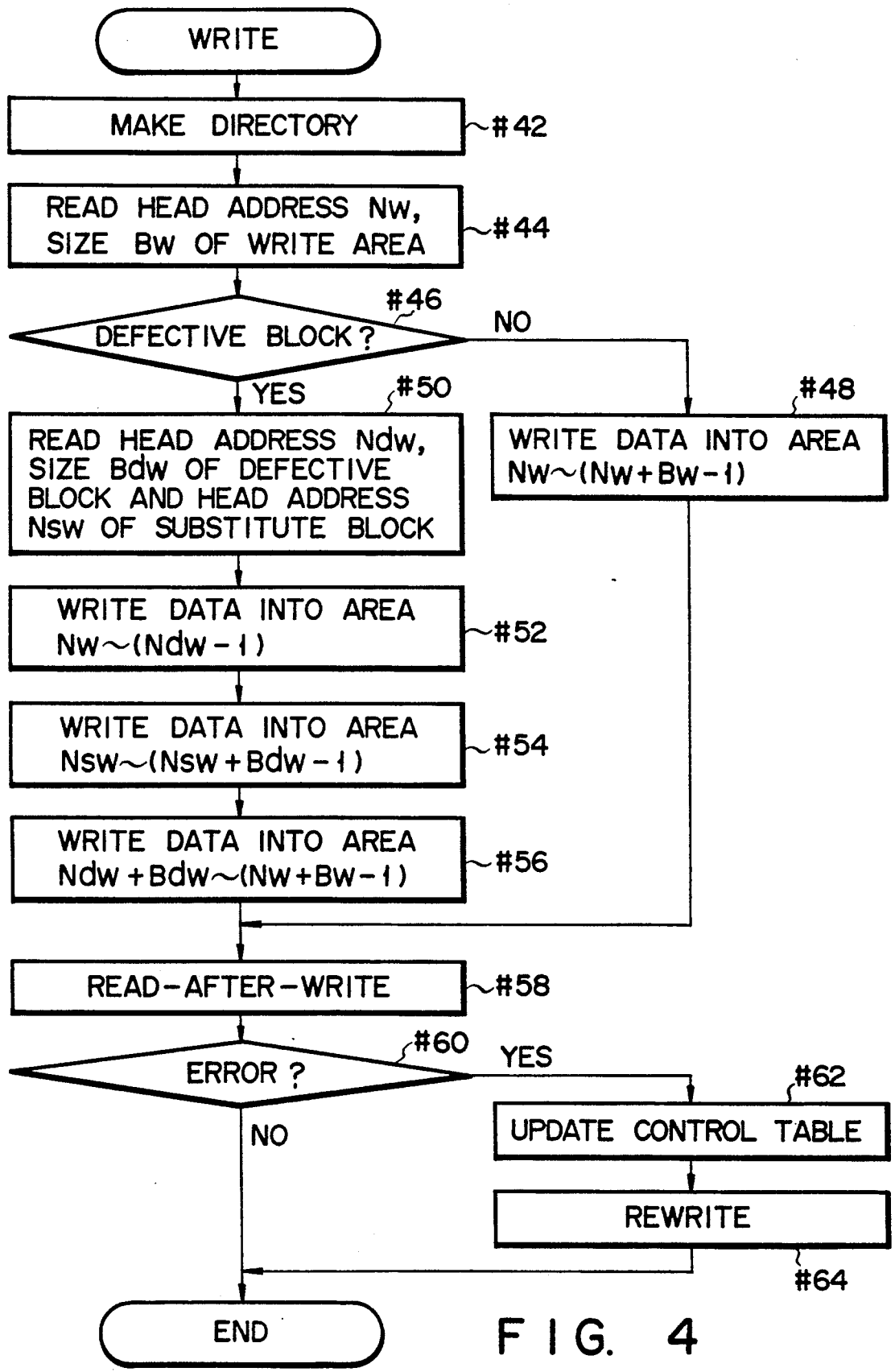
FIG. 4 is a flow chart for explaining an operation in a write mode in this embodiment.

An actual access operation will be described hereinafter. First, a write operation will be described with reference to FIG. 4. When a write request is transferred from the host controller to the access controller 24 through the interface 28, an operation flow shown in FIG. 4 is started. In step #42, the access controller 24 makes a directory representing a correspondence between logical and physical addresses in the directory memory 22. The access controller 24 also outputs an instruction to the disk installment unit 14 to install selected one of optical disks 12 in the disk drive unit 16, and requests the controller 18 to write data. In this case, the physical addresses may be respectively assigned to each optical disk 12, or may be continuously assigned to all the disks 12. It is noted that the directory data associated with each disk may also be stored in the directory area 12D of the corresponding disk 12.

In step #44, the controller 18 calculates a head physical block address Nw and the number of blocks Bw in a write area. In step #46, the controller 18 determines whether or not a defective block is present in the write area (physical addresses: Nw to (Nw+Bw−1)), referring to the defect control table in the defect control memory 20. If no defective block is present, data are sequentially written in the write area (physical addresses Nw to (Nw+Bw−1)) in step #48.

If a defective block is present, a head physical block address Ndw and the number of blocks Bdw of the defective block, and a head physical block address Nsw of a substitute block are fetched from the defect control table in step #50. In step #52, data is written into the area (physical addresses: Nw to (Ndw−1)) from the head block to the block immediately before the defective block in the write area. In step #54, data is written in the substitute block area (physical addresses: Nsw to (Nsw+Bdw−1)). Finally, data is written into the area (physical addresses: (Ndw+Bdw) to (Nw+Bw−1)) from the block immediately after the defective block to the last block in the write area in step #56. Thus, in a write mode, substitute processing can be started within a short period of time on the basis of the defect control table formed in the memory 20 in advance. Therefore, a time period required to perform a write operation can be shortened.

FIG. 5 shows a memory map associated with substitute tute processing in the write mode. More specifically, of the write areas (physical addresses: Nw to (Nw+Bw −1)) in the user recording area, the defective block (physical addresses: Ndw to (Ndw+Bdw−1)) is substituted by the substitute area (physical addresses: Nsw to (Nsw+Bdw−1)).

It is noted that if a block is determined to be incapable of being accessed due to a tracking error or a synchronous error during a data write operation, the defect control table in the memory 20 is updated.

After the write operation is completed, a read-after-write operation is performed in step #58, and it is determined in step #60 whether or not the write operation is accurately performed. If a write error is found, this block is written in the defect control area in the optical disk 12 as a defective block in step #62. In addition, this defective block is registered in the defect control memory 20, and the defect control table is updated. In step #64, substitute processing is performed in accordance with the data of the defect control table 20, and a rewrite operation is performed. The rewrite operation may be repeated up to five times.

Figure 6:
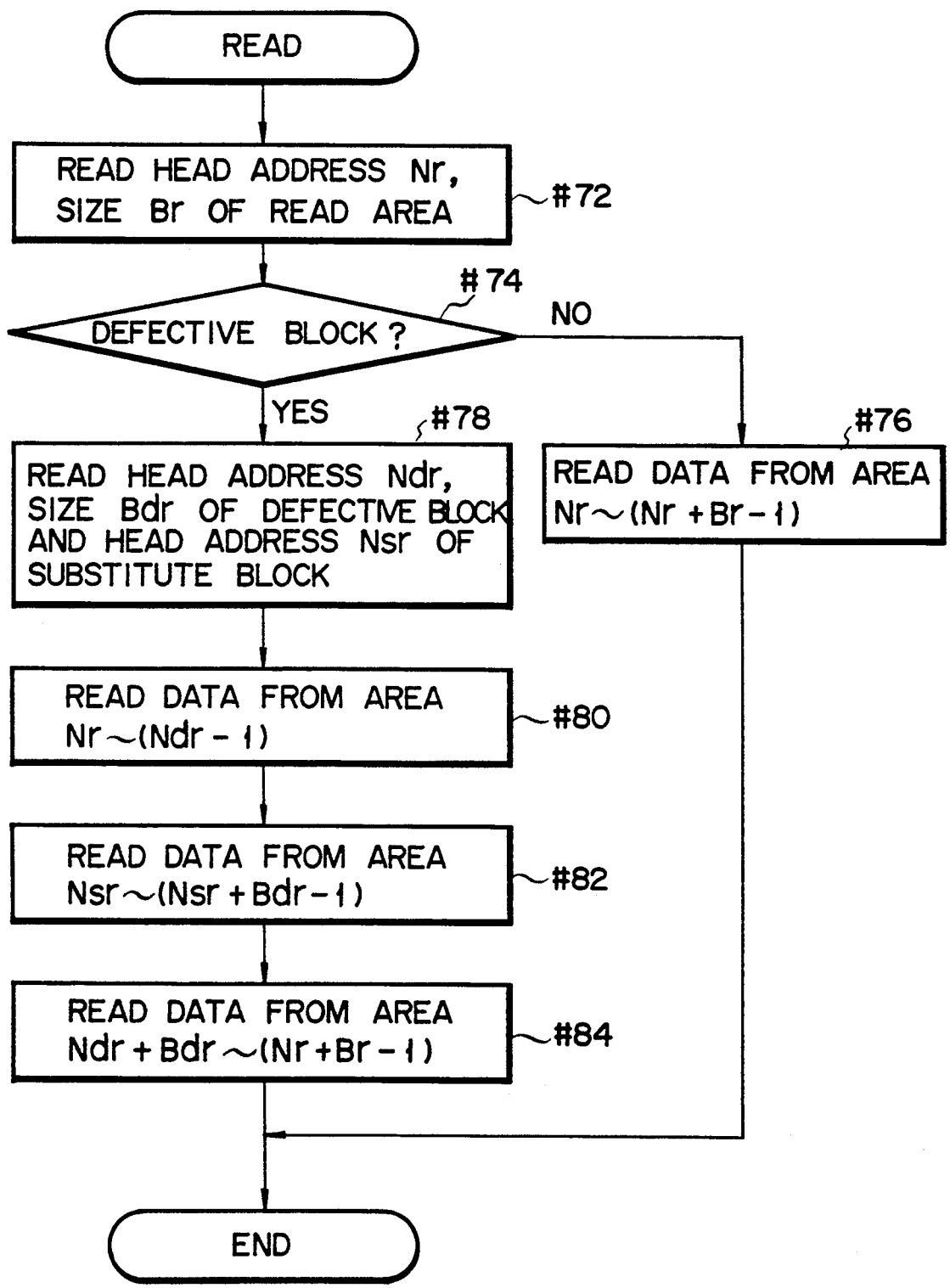
FIG. 6 is a flow chart for explaining an operation in a read mode in this embodiment.

A read operation will be described hereinafter with reference to FIG. 6. When a read request is transferred from the host controller to the access controller 24 through the interface 28, the operation flow shown in FIG. 6 is started. In step #72, the access controller 24 refers to data in the directory memory 22, and determines a block of the optical disk 12 in which the read data is stored. A head physical block address Nr and the number of blocks Br in the read area are calculated. The access controller 24 outputs an instruction to the disk installment unit 14 to install the corresponding optical disk in the disk drive unit 16, and also requests the controller 18 to read the data.

In step #74, the controller 18 determines whether or not a defective block is present in a read area (physical addresses: Nr to (Nr+Br−1)), referring to the defect control table in the defect control memory 20. If no defective block is present, data is read out from the read area (physical addresses: Nr to (Nr+Br−1)) in step #76.

If a defective block is present, a head physical block address Ndr and the number of blocks Bdr of the defective block, and a head physical block address Nsr of a substitute block are fetched from the defect control table in step #78. In step #80, data is read out from the area (physical addresses: (Nr to (Ndr−1)), i.e., from a head block to a block immediately before the defective block in the read area in the user recording area. In step #82, data is read out from the substitute block (physical addresses: Nsr to (Nsr+Bdr−1)). Finally, data is read out from the area (physical addresses: (Ndr+Bdr) to (Nr+Br−1)), i.e., from the block immediately after the defective block to the last block in the read area in the user recording area in step #84. Thus, also in the read mode, substitute processing can be started within a short period of time on the basis of the defect control table made in advance, and hence a time period required to perform a read operation can be shortened.

It is noted that when the optical disks 12 are detached from the disk installment unit 1 to exchange the medium because the service life of the disks 12 is ended, or no vacant area is left in the disks 12, the contents of the defect data memory 20 and the directory memory 22 must be written in the disk 12 to be detached. When the disk 12 is exchanged, these memories 20 and 22 must be initialized, and data must be initially transferred from the exchanged disk to the memories 20 and 22.

The present invention is not limited to the above embodiment, and various changes and modifications may be made. The recording medium is not limited to the above mentioned optical disk. An auto changer apparatus for the other type recording medium can be also realized according to the present invention. Although the defect control memory 20 and the directory memory 22 are arranged in the auto changer 10 in the above embodiment, one or both of these memories 20 and 22 may be arranged outside the auto changer 10 and connected to the access controller 24. When the auto changer 10, in which the disk 12 is electrically sealed or software-sealed, and the optical disk 12 cannot be detached from the disk installment unit 14 after shipment, is used, defect area data need not be written in the defect control area 12B in the disk 12.

As described above, according to the present invention, defect control data in all the recording media in the auto changer apparatus are read out in advance during initialization to make a defect control table in the memory. If a new defective block is found in a write mode or a read-after-write mode, the defect control table is updated. Therefore, in the write or read mode, substitute processing is performed, if necessary, on the basis of the defect control table made in advance, and a logical address can be converted into a physical address on the basis of the directory at the same time when the medium is installed in the drive unit. Therefore, a time period required to perform a pre-process such as substitute processing of a defective track and making of a directory upon installment of the medium in the drive unit can be shortened. As a result, an access time to the recording medium can also be shortened. When this auto changer is used for an image filing system, a time period required to open a file can be decreased, and a recorded image can be seen within a short period of time.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A data filing apparatus comprising:
    a plurality of data filling media received in a housing each having defect control data associated with an initial defective area and a substitute area for the defective area;
    first memory means, placed outside said data filing media, for storing the defect control data of said plurality of data filing media;
    initiating means for reading out the defect control data from said data filing media and writing the readout data in said first memory means prior to a first access to said data filing media;
    second memory means, placed outside said data filing media, for storing directory data representing a correspondence between a logical address for the data filing apparatus and a physical address of each of said data filing media;
    a drive unit for performing an access operation for the recording media;
    means for selectively installing one of said recording media into said drive unit in accordance with an externally supplied logical address and the directory data in said second memory means;
    means for detecting the presence/absence of a defective area in an access area in accordance with the data of said first memory means upon access to said data filing media, and for accessing a substitute area in place of the defective area when the presence of the defective area is detected; and
    updating means for writing the defect control data associated with the defective area in said first memory means when the defective area is detected upon access to said data filing media.

2. The apparatus according to claim 1, in which said initiating means comprises means for writing a head physical address of the initial defective area, a size of the defective area, a head physical address of the substitute area, and a size of the substitute area in said first memory means, and said updating means comprises means for writing, in said first memory means, a physical address of the defective area, a physical address of the substitute area, and a last physical address of the substitute area which has been already used at a timing when an instruction is output to read out the defect control data.

3. The apparatus according to claim 1, in which each of said data filing media is a write-once type optical disk.

4.. The apparatus according to claim 3, in which a recording area of said optical disk is divided into a substitute area, a defect control data area, a control are which stores defect control data associated with an initial defect, a directory area, and a user recording area.

5. The apparatus according to claim 1, in which said first and second memory means are nonvolatile semiconductor memories.

6. The apparatus according to claim 1, wherein said initiating means includes means for making a defect control table containing defect control data for each of each plurality of recording media.

* * * * *